(12) United States Patent
Sasame

(10) Patent No.: US 10,263,686 B2
(45) Date of Patent: Apr. 16, 2019

(54) COMMUNICATION SYSTEM, TRANSMISSION DEVICE, AND COMMUNICATION METHOD

(71) Applicant: NEC CORPORATION, Tokyo (JP)

(72) Inventor: Toshiaki Sasame, Tokyo (JP)

(73) Assignee: NEC CORPORATION, Tokyo (JP)

( * ) Notice: Subject to any disclaimer, the term of this patent is extended or adjusted under 35 U.S.C. 154(b) by 36 days.

(21) Appl. No.: 15/523,950

(22) PCT Filed: Oct. 7, 2015

(86) PCT No.: PCT/JP2015/078510
§ 371 (c)(1),
(2) Date: May 3, 2017

(87) PCT Pub. No.: WO2016/072206
PCT Pub. Date: May 12, 2016

(65) Prior Publication Data
US 2017/0338882 A1    Nov. 23, 2017

(30) Foreign Application Priority Data
Nov. 5, 2014  (JP) ................. 2014-225200

(51) Int. Cl.
*H04B 7/10*    (2017.01)
*H04B 7/0456*    (2017.01)
(Continued)

(52) U.S. Cl.
CPC ............ *H04B 7/10* (2013.01); *H04B 7/0456* (2013.01); *H04L 1/0004* (2013.01);
(Continued)

(58) Field of Classification Search
None
See application file for complete search history.

(56) References Cited

U.S. PATENT DOCUMENTS 7,010,180 B2 * 3/2006 van Wijngaarden ....................... H04B 10/2569
359/489.03
2004/0087282 A1    5/2004 Ishikawa
(Continued)

FOREIGN PATENT DOCUMENTS

JP    2003-204317    7/2003
JP    2004-517549    6/2004
(Continued)

OTHER PUBLICATIONS

International Search Report, PCT/JP2015/078510, dated Dec. 8, 2015.
(Continued)

Primary Examiner — Michael J Moore, Jr.
(74) Attorney, Agent, or Firm — Young & Thompson

(57) ABSTRACT

A reception device includes receivers and controller. Receivers receive a plurality of modulation signals modulated by a transmission device. Controller selects a communication scheme on the basis of phase difference between reception signals, which are the modulation signals received by the receivers, and of polarization plane deviation of the reception signals from transmission signals, which are the modulation signals transmitted from the transmission device, and sets, for the transmission device, a modulation scheme corresponding to the communication scheme.

19 Claims, 15 Drawing Sheets

(51) Int. Cl.
 *H04L 1/00* (2006.01)
 *H04L 27/00* (2006.01)
 *H04B 7/0413* (2017.01)
 *H04B 7/06* (2006.01)

(52) U.S. Cl.
 CPC ........ *H04L 27/0008* (2013.01); *H04B 7/0413* (2013.01); *H04B 7/0669* (2013.01)

(56) References Cited

U.S. PATENT DOCUMENTS

| | | | | |
|---|---|---|---|---|
| 2008/0279301 | A1* | 11/2008 | Khan | H04B 7/0669 375/267 |
| 2009/0041151 | A1* | 2/2009 | Khan | H04L 5/0023 375/267 |
| 2012/0183303 | A1* | 7/2012 | Onohara | H04B 10/40 398/136 |
| 2012/0294176 | A1 | 11/2012 | Miyata | |
| 2013/0003789 | A1* | 1/2013 | Eom | H04B 7/0469 375/219 |
| 2013/0012144 | A1* | 1/2013 | Besoli | H01Q 1/36 455/85 |
| 2013/0108270 | A1* | 5/2013 | Zhang | H04J 14/06 398/65 |
| 2015/0207551 | A1* | 7/2015 | Kang | H04B 7/0608 375/296 |
| 2016/0285562 | A1* | 9/2016 | Ogasahara | H04B 10/6164 |
| 2016/0337056 | A1* | 11/2016 | Frenne | H04B 7/0695 |

FOREIGN PATENT DOCUMENTS

| | | |
|---|---|---|
| JP | 2008-098967 | 4/2008 |
| JP | 2008-538261 | 10/2008 |
| JP | 2011-147002 | 7/2011 |
| JP | 2013-535143 | 9/2013 |
| JP | 2013-211887 | 10/2013 |
| JP | 2013-251915 | 12/2013 |
| WO | WO 2009/069798 | 6/2009 |

OTHER PUBLICATIONS

Yu Deng; Burr, A.; White, G., Performance of MIMO systems with combined polarization multiplexing and transmit diversity, Vehicular Technology Conference, 2005. VTC 2005—Spring. 2005 IEEE 61st, vol. 2, Jun. 1, 2005, pp. 869-873.

Masanori Yofune, Webber Julian, Kazuto Yano, Hiroshi Ban, Kiyoshi Kobayashi, "Proposal of Multi-Polarization Spatial Multiplexing for Satellite Communication", IEICE Technical Report. RCS, Radio Communication System, Aug. 23, 2012 (Aug. 23, 2012), 112 (192), pp. 49 to 53.

* cited by examiner

COMMUNICATION SYSTEM, TRANSMISSION DEVICE, AND COMMUNICATION METHOD

TECHNICAL FIELD

The present invention relates to a communication system, a transmission device, and a communication method which support a plurality of communication schemes.

BACKGROUND ART

Patent Document 1 discloses a communication method in which a polarized-wave multiplexing transmission scheme using an XPIC (a cross polarization interference canceller) and a spatial multiplex transmission scheme using a MIMO (multiple-input multiple-output) system are combined. By using this communication method, the signal multiplicity can be increased, and thus, the capacity of a communication path can be increased. However, when a communication device supporting the communication scheme is actually operated, the stability of communication performed by the polarized-wave multiplexing transmission scheme or the spatial multiplex transmission scheme varies in accordance with the state of the transmission path. Accordingly, stable communication is difficult to secure.

Meanwhile, Patent Document 2 suggests appropriately switching communication schemes in accordance with the state of a transmission path.

RELATED ART DOCUMENTS

Patent Documents

Patent Document 1: Re-publication of International Publication No. WO2009/069798
Patent Document 2: Japanese Patent Laid-Open No. 2013-251915A

SUMMARY

However, Patent Document 2 does not disclose any specific method for switching communication schemes to secure a stable transmission path. In particular, Patent Document 2 does not disclose a method for switching communication schemes using polarization, such as polarized wave diversity schemes or polarized-wave multiplexing schemes, or an interference canceller suited for such communication schemes. Accordingly, securing a stable transmission path is a difficult problem to solve.

An object of the present invention is to provide a communication system, a transmission device, and a communication method which are capable of securing a stable transmission path.

A communication system according to one aspect of the present invention includes a modulator unit that outputs a plurality of modulation signals modulated by using a set modulation scheme, a transmitter that transmits the plurality of modulation signals, a receiver that receives the plurality of modulation signals transmitted from the transmitter, a controller that selects a communication scheme on the basis of parameters corresponding to phase difference between reception signals, which are the modulation signals received by the receiver, and of polarization plane deviation of the reception signals from transmission signals, which are the modulation signals transmitted from the transmitter, and a setter that sets, for the modulator unit, a modulation scheme corresponding to the communication scheme selected by the controller.

A reception device according to one aspect of the present invention includes a receiver that receives a plurality of modulation signals modulated by a transmission device, and a controller that selects a communication scheme on the basis of parameters corresponding to phase difference between reception signals, which are the modulation signals received by the receiver, and of polarization plane deviation of the reception signals from transmission signals, which are the modulation signals transmitted from the transmitter, and sets, for the transmission device, a modulation scheme corresponding to the communication scheme.

A communication method according to one aspect of the present invention includes outputting a plurality of modulation signals modulated by using a set modulation scheme, transmitting the plurality of modulation signals, receiving the plurality of modulation signals transmitted from a transmitter, selecting a communication scheme on the basis of parameters corresponding to phase difference between reception signals, which are the received modulation signals, and of polarization plane deviation of the reception signals from transmission signals, which are the transmitted modulation signals, and setting a modulation scheme corresponding to the selected communication scheme.

EXEMPLARY EMBODIMENT

Figure 1:
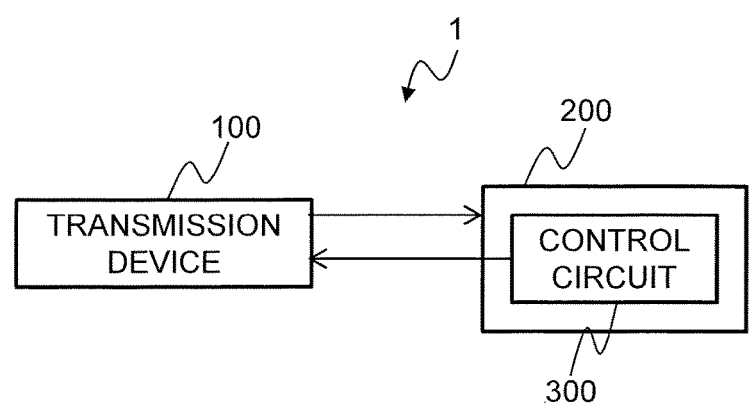
FIG. 1 is a diagram illustrating a communication system according to a first exemplary embodiment of the present invention.

Hereinafter, exemplary embodiments of the present invention will be described with reference to the drawings. In the following description, components having the same functions are denoted by the same reference numerals, and the explanations thereof are omitted in some cases.

FIG. 1 is a diagram illustrating a communication system according to a first exemplary embodiment of the present invention. Communication system 1 illustrated in FIG. 1 includes transmission device 100 and reception device 200 each of which is a communication device supporting a plurality of communication schemes.

Transmission device 100 transmits to reception device 200 a plurality of modulation signals modulated with use of a modulation scheme corresponding any of the plurality of supported communication schemes. Further, after receiving a control signal from reception device 200, transmission device 100 sets, for transmission device 100 itself, a modulation scheme to be used for modulation on the basis of the control signal. Specifically, the control signal indicates a communication scheme, and transmission device 100 sets a modulation scheme corresponding to the communication scheme indicated by the control signal.

It is assumed that specific communication schemes supported by transmission device 100 include first to fourth communication schemes described below.

The first communication scheme is a SISO (single input single output) communication scheme. Specifically, the first communication scheme is obtained by combining a PWD (polarized wave diversity) scheme and an SD (space diversity) scheme. In the present exemplary embodiment, the SD scheme is assumed to be a scheme that uses an STBC (space time block code). Hereinafter, the SD scheme using an STBC is referred to as an STBC scheme.

Instead of the aforementioned communication scheme obtained by combining the PWD scheme and the STBC scheme, a communication scheme using only one transmission antenna or a communication scheme using only an H polarization signal or a V polarization signal may be used as the first communication scheme.

The second communication scheme is obtained by combining the PWD scheme and a spatial multiplex transmission scheme. In the present exemplary embodiment, the spatial multiplex transmission scheme is assumed to be a scheme that uses a MIMO system. Hereinafter, the spatial multiplex transmission scheme using the MIMO system is referred to as a MIMO scheme.

The third communication scheme is obtained by combining the polarized-wave multiplexing transmission scheme and the STBC scheme. In the present exemplary embodiment, it is assumed that, in the polarized-wave multiplexing transmission scheme, interference is cancelled by using an XPIC that cancels cross polarization interference. Hereinafter, the polarized-wave multiplexing transmission scheme using an XPIC is referred to as an XPIC scheme.

The fourth communication scheme is obtained by combining the XPIC scheme and the MIMO scheme. This communication scheme is referred to as a 4×4 MIMO scheme, in some cases.

Reception device 200 receives a plurality of transmission signals, which are modulation signals transmitted from transmission device 100, and demodulates a plurality of reception signals, which are the received modulation signals. In addition, reception device 200 includes control circuit 300 that calculates parameters corresponding to the state of the transmission path between transmission device 100 and reception device 200 and that selects any of the plurality of supported communication schemes on the basis of the calculated parameters. Control circuit 300 is a controller that notifies transmission device 100 about a control signal that indicates the selected communication scheme, and thereby, sets, for transmission device 100, a modulation scheme corresponding to the selected communication scheme.

Figure 2:
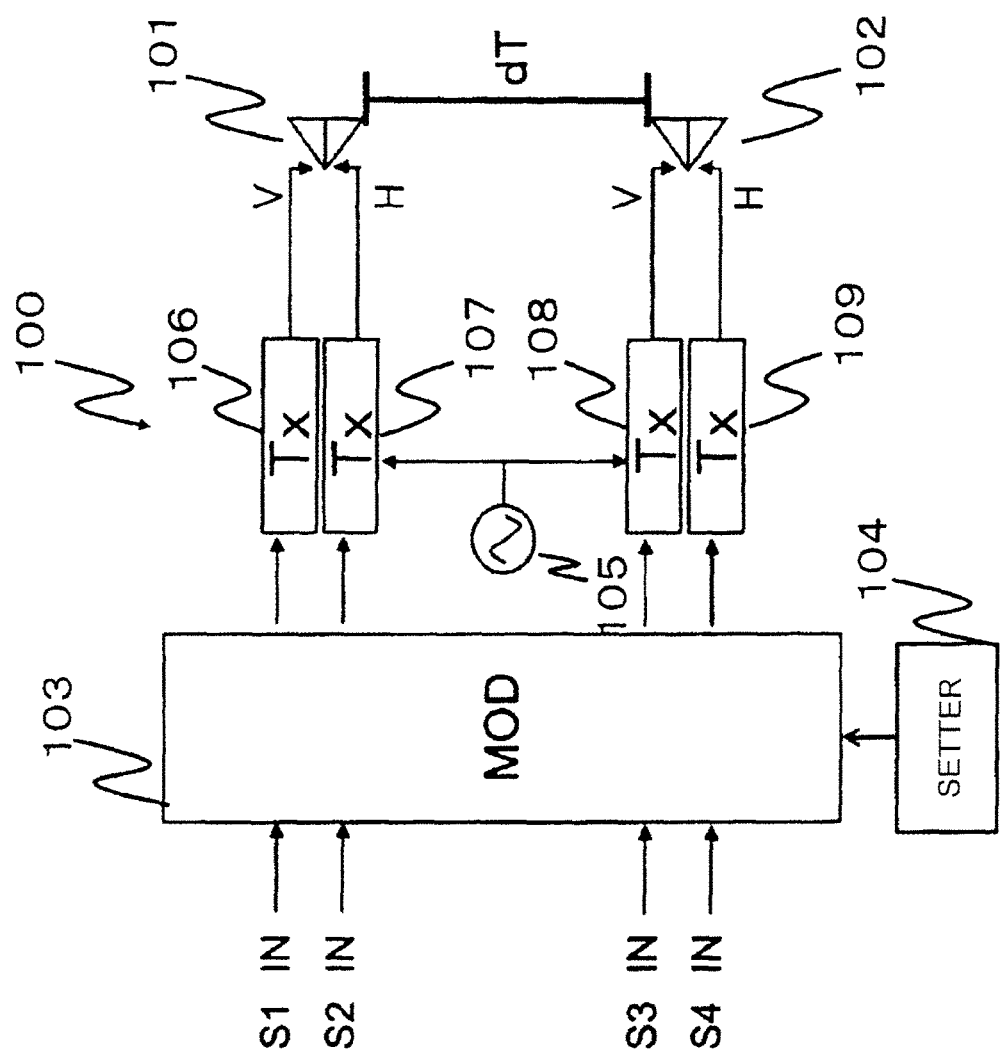
FIG. 2 is a diagram illustrating a configuration example of a transmission device according to the first exemplary embodiment of the present invention.

FIG. 2 is a diagram illustrating a configuration example of transmission device 100. Transmission device 100 illustrated in FIG. 2 includes transmission antennas 101 and 102, modulator unit (MOD) 103, setter 104, local oscillator 105, and transmission circuits (Tx) 106 to 109.

Transmission antennas 101 and 102 are polarization shared antennas capable of transmitting two polarization signals different from each other. In the present exemplary embodiment, the two polarization signals are a V (vertical) polarization signal and an H (horizontal) polarization signal. In addition, transmission antennas 101 and 102 are set at an interval dT suited for the MIMO scheme.

For modulator unit 103, a modulation scheme corresponding to any one of the plurality of communication schemes supported by transmission device 100 is set. Modulator unit 103 outputs, to transmission circuits 106 to 109 respectively, a plurality of signals modulated by using the set modulation scheme. In the present exemplary embodiment, modulator unit 103 receives at most four signals S1 to S4, and outputs four modulation signals obtained by modulating the received signals. Signals S1 to S4 that are inputted to modulator unit 103 are assumed to be BB (base-band) signals. The modulation signals outputted from modulator unit 103 are assumed to be IF (intermediate frequency) signals.

Setter 104 receives a control signal from reception device 200, and sets, for modulator unit 103, a modulation scheme corresponding to the communication scheme that is indicated by the received control signal.

Local oscillator 105 generates oscillation signals for converting IF signals to RF (radio frequency) signals and supplies the oscillation signals to transmission circuits 106 to 109. For simplification of the drawing, FIG. 2 apparently illustrates that local oscillator 105 is connected only to transmission circuits 107 and 108. However, local oscillator 105 is actually connected to all transmission circuits 106 to 109.

Transmission circuits 106 to 109 are included in a transmitter that transmits the modulation signals outputted from modulator unit 103. Specifically, four different modulation signals outputted from modulator unit 103 are respectively inputted to transmission circuits 106 to 109. Transmission circuits 106 to 109 each convert the inputted modulation signal to an RF signal by using the oscillation signal supplied from local oscillator 105, and transmit the RF signal to reception device 200 via transmission antenna 101 or 102. In the present exemplary embodiment, it is assumed that transmission circuits 106 and 107 transmit the RF signals via transmission antenna 101, and transmission circuits 108 and 109 transmit the RF signals via transmission antenna 102. Further, transmission circuits 106 to 109 may perform processes of amplifying the RF signals to a prescribed transmission output level, for example.

Figure 3:
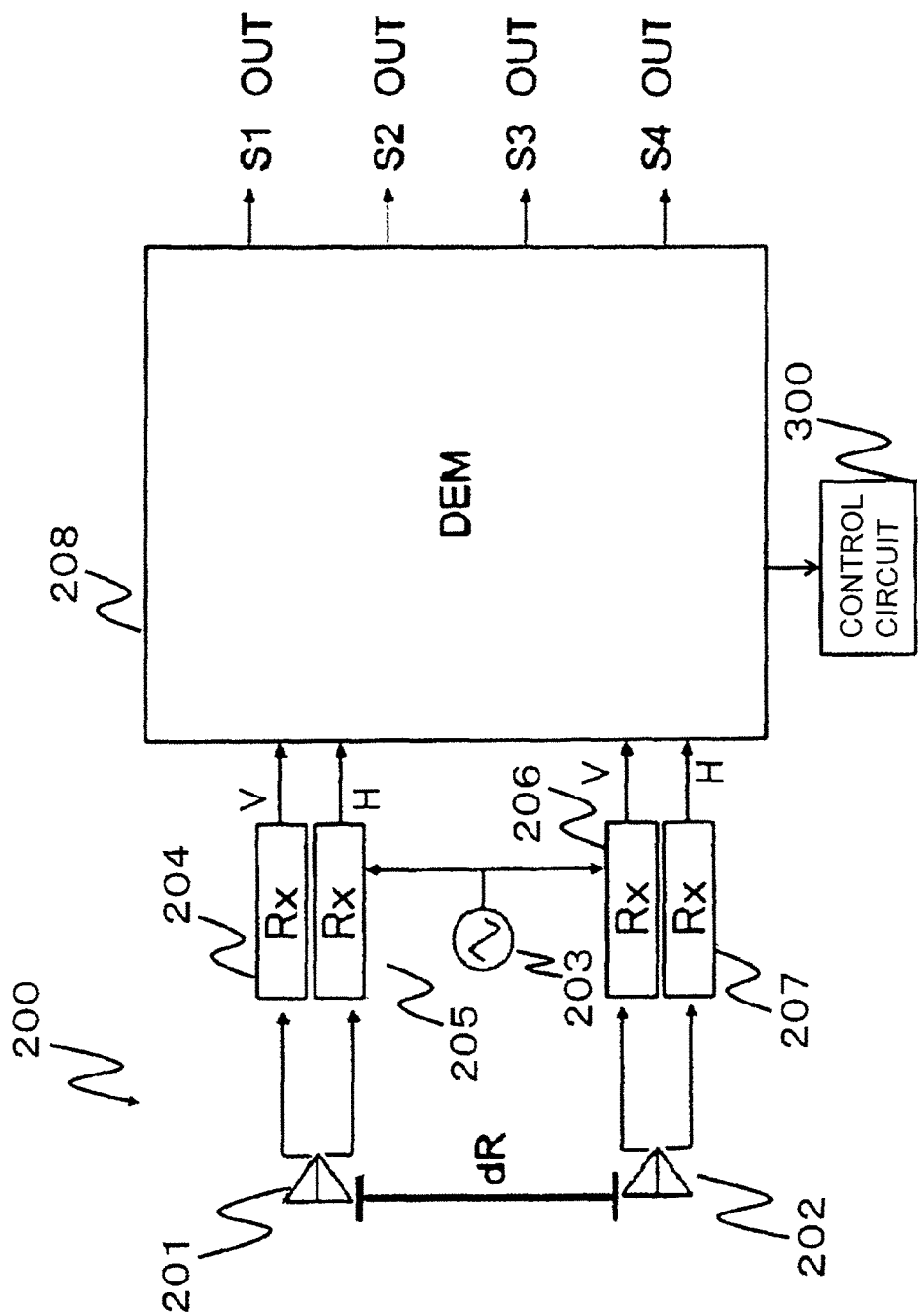
FIG. 3 is a diagram illustrating a configuration example of a reception device according to the first exemplary embodiment of the present invention.

FIG. 3 is a diagram illustrating a configuration example of reception device 200. Reception device 200 illustrated in FIG. 3 includes reception antennas 201 and 202, local oscillator 203, reception circuits (Rx) 204 to 207, demodulator unit (DEM) 208, and control circuit 300.

Reception antennas 201 and 202 are polarization shared antennas capable of receiving two polarization signals different from each other. The two polarization signals are a V polarization signal and an H polarization signal, as described above. In addition, reception antennas 201 and 202 are set at an interval dR suited for the MIMO system. For example, the interval dR may be equal to the interval dT between transmission antennas 101 and 102 of the transmission device 100.

Local oscillator 203 generates oscillation signals for converting RF signals to IF signals and supplies the oscillation signals to reception circuits 204 to 207. For simplification of the drawing, FIG. 3 apparently illustrates that local oscillator 203 is connected only to reception circuits 205 and 206. However, local oscillator 203 is actually connected to all of reception circuits 204 to 207.

Reception circuits 204 to 207 are included in the receiver that receives RF signals, which are the plurality of transmission signals transmitted from transmission device 100. Specifically, reception circuits 204 to 207 receive the RF signals via reception antennas 201 or 202, and divide the received RF signals into V polarization signals and H polarization signals. Reception circuits 204 to 207 each convert the separated V polarization signal or the separated H polarization signal to an IF signal by using the oscillation signal for RF supplied from local oscillator 203, and input the converted IF signal to demodulator unit 208. In the present exemplary embodiment, it is assumed that reception circuits 204 and 205 receive the RF signals via reception antenna 201, and reception circuits 206 and 207 receive the RF signals via reception antenna 202. In addition, it is assumed that reception circuits 204 and 206 input V polarization signals to demodulator unit 208, and reception circuits 205 and 207 input H polarization signals to demodulator unit 208. Division into V polarization signals and H polarization signals is usually not completely performed, and both V polarization signals and H polarization signals include interference components that interfere with each other.

Demodulator unit 208 demodulates the IF signals inputted from reception circuits 204 to 207 and outputs the demodulated signals. In the present exemplary embodiment, demodulator unit 208 outputs at most four signals S1_OUT to S4_OUT in accordance with the modulation scheme used by transmission device 100.

Control circuit 300 calculates, as parameters corresponding to the state of the transmission path between transmission device 100 and reception device 200, parameters corresponding to phase difference between the reception signals received by reception circuits 204 to 207 and to polarization plane deviation of the reception signals from the transmission signals transmitted from transmission device 100. Specifically, the parameters include a first parameter X corresponding to the phase difference between the reception signals and a second parameter Y corresponding to the polarization plane deviation of the reception signals from the transmission signals.

In the present exemplary embodiment, demodulator unit 208 obtains singular values of a channel matrix between transmission antennas 101 and 102 of transmission device 100 and reception antennas 201 and 202 of reception device 200, and obtains tap coefficients of a transversal filter to be used for an XPIC provided to demodulator unit 208. Control circuit 300 then calculates the parameters on the basis of the singular values and the tap coefficients obtained by demodulator unit 208. A method for calculating the parameters will be described later in more detail.

Control circuit 300 selects a communication scheme on the basis of the calculated parameters, notifies transmission device 100 about a control signal that indicates of the selected communication scheme, and thereby, sets, for transmission device 100, a modulation scheme corresponding to the selected communication scheme.

Specifically, first, control circuit 300 determines, on the basis of the parameters, whether or not the phase difference falls within a first allowance range and whether or not the polarization plane deviation falls within a second allowance range. In the present exemplary embodiment, when the first parameter X is a first threshold or greater, control circuit 300 determines that the phase difference falls within the first allowance range, and when the second parameter is less than a second threshold, control circuit 300 determines that the polarization plane deviation falls within the second allowance range.

Subsequently, control circuit 300 selects a communication scheme on the basis of the result of the determination. Specifically, when the phase difference does not fall within the first allowance range, control circuit 300 selects a communication scheme including the STBC scheme. When the phase difference falls within the first allowance range, control circuit 300 selects a communication scheme including the MIMO. In addition, when the polarization plane deviation does not fall within the second allowance range, control circuit 300 selects a communication scheme including the PWD scheme. When the polarization plane deviation falls within the second allowance range, control circuit 300 selects a communication scheme including the XPIC scheme. In this case, the correspondence between the communication schemes and the parameters shown in Table 1 below is obtained.

TABLE 1

| Modulation scheme | Parameter X | Parameter Y | Communication capacity |
|---|---|---|---|
| (1) PWD + STBC | Less than threshold | Not less than threshold | C |
| (2) PWD + MIMO | Not less than threshold | Not less than threshold | 2 × C |
| (3) XPIC + STBC | Less than threshold | Less than threshold | 2 × C |
| (4) XPIC + MIMO (4 × 4MIMO) | Not less than threshold | Less than threshold | 4 × C |

Table 1 includes communication capacities in the respective communication schemes where the communication capacity in the first communication scheme (PWD scheme+ STBC scheme) is defined as C.

Figure 4:
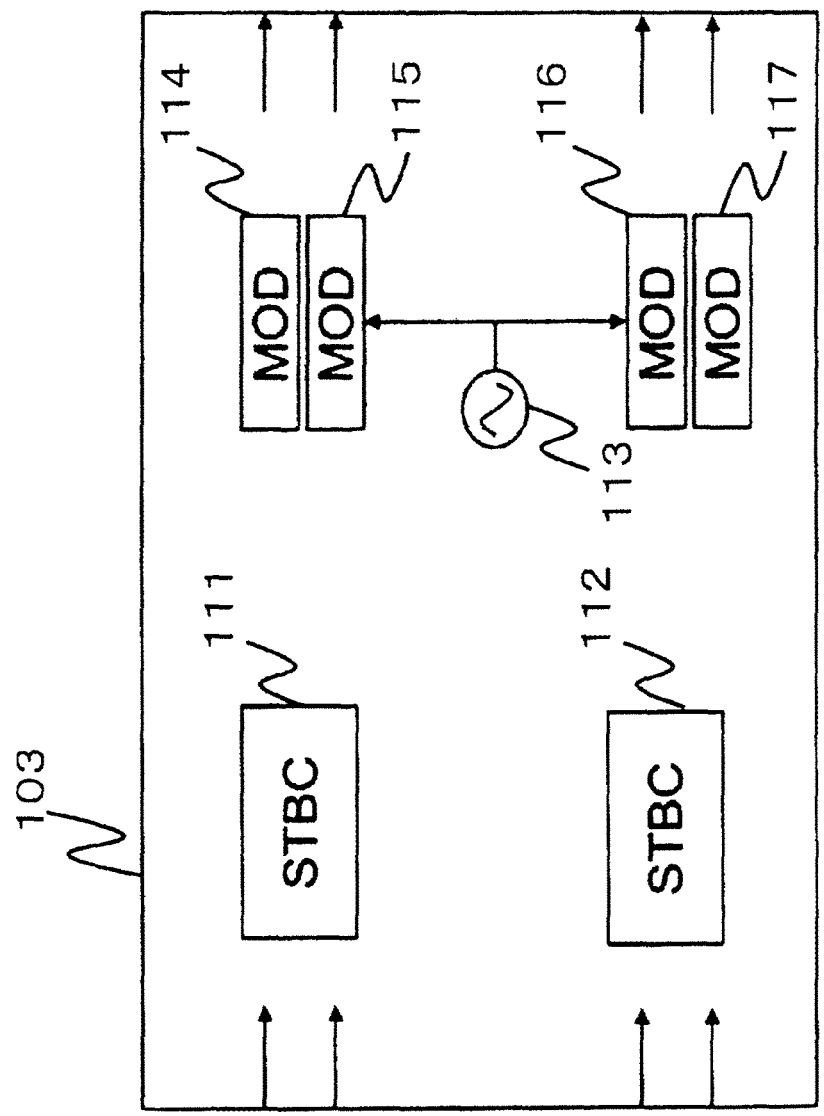
FIG. 4 is a diagram illustrating a configuration example of a modulator unit according to the first exemplary embodiment of the present invention.

Next, the configuration of modulator unit 103 of transmission device 100 will be described in more detail. FIG. 4 is a block diagram illustrating a configuration example of modulator unit 103. Modulator unit 103 illustrated in FIG. 4 includes time code adding circuits (STBC) 111 and 112, local oscillator 113, and modulators 114 to 117.

Time code adding circuits 111 and 112 output two signals that are obtained by encoding inputted signals by using an STBC. Local oscillator 113 generates oscillation signals for converting BB signals to IF signals, and supplies the oscillation signals to modulators 114 to 117. Modulators 114 to 117 each modulate an inputted BB signal to an IF signal by using an oscillation signal supplied from local oscillator 113, and output the IF signal. Modulators 114 to 117 also perform multi-value modulation on the inputted BB signals. For simplification of the drawing, FIG. 4 apparently illustrates that local oscillator 113 is connected only to modulators 115 and 116. However, local oscillator 113 is actually connected to all modulators 114 to 117.

In the configuration illustrated in FIG. 4, setter 104 illustrated in FIG. 2 sets a modulation scheme for modulator unit 103 by switching the connection relation in modulator unit 103 on the basis of the communication scheme indicated by the control signal.

Figure 5:
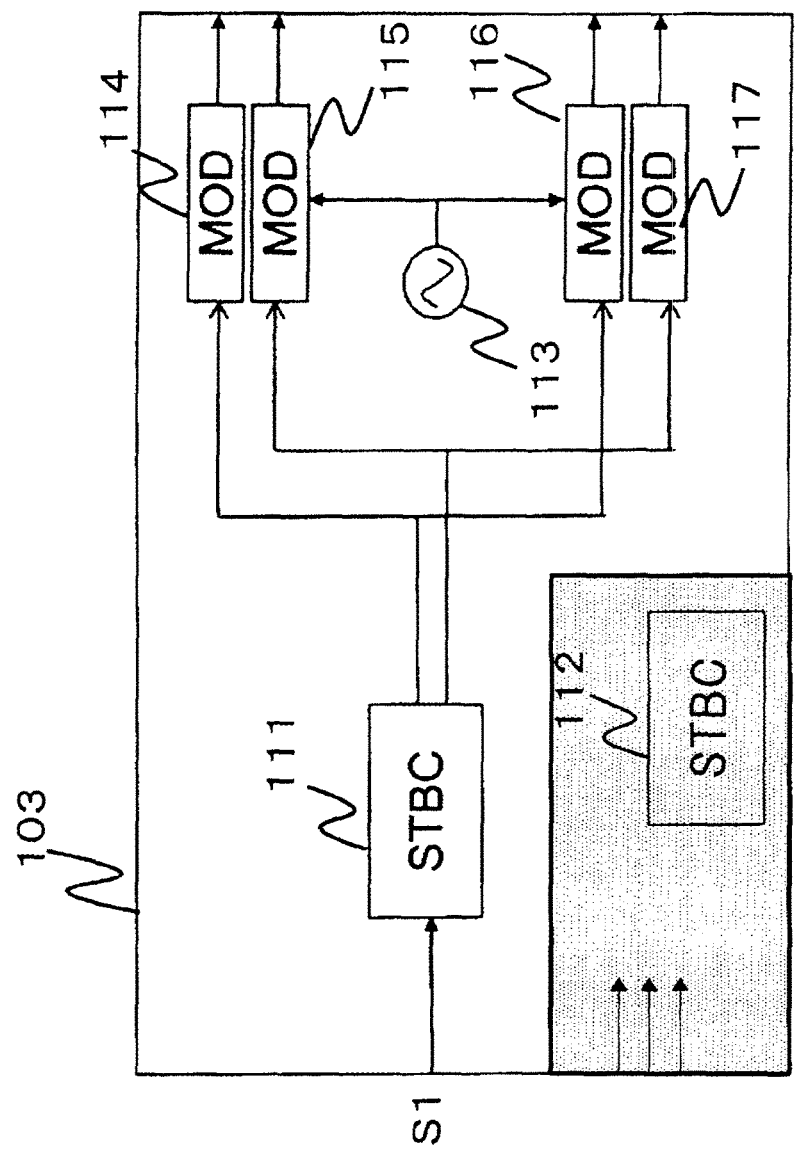
FIG. 5 is a diagram illustrating another configuration example of the modulator unit according to the first exemplary embodiment of the present invention.

FIG. 5 is a block diagram illustrating the configuration of modulator unit 103 for which a modulation scheme corresponding to the first communication scheme is set. In FIG. 5, any one of inputted signals S1 to S4 (here, inputted signal S1) is inputted to time code adding circuit 111. One of signals encoded by time code adding circuit 111 is branched into two and the two branched signals are inputted to modulator 114 and 116, respectively. The other signal encoded by time code adding circuit 111 is branched into two and the two branched signals are inputted to modulators 115 and 117, respectively. The signals modulated by modulators 114 to 117 are inputted to transmission circuits 106 to 109, respectively.

When the configuration illustrated in FIG. 5 is achieved, inputted signals S1 having been encoded by the STBC are transmitted as a V polarization signal and an H polarization signal via transmission antennas 101 and 102, respectively. Accordingly, inputted signal S1 is transmitted by the first communication scheme which is the combination of the PWD scheme and the STBC scheme.

Figure 6:
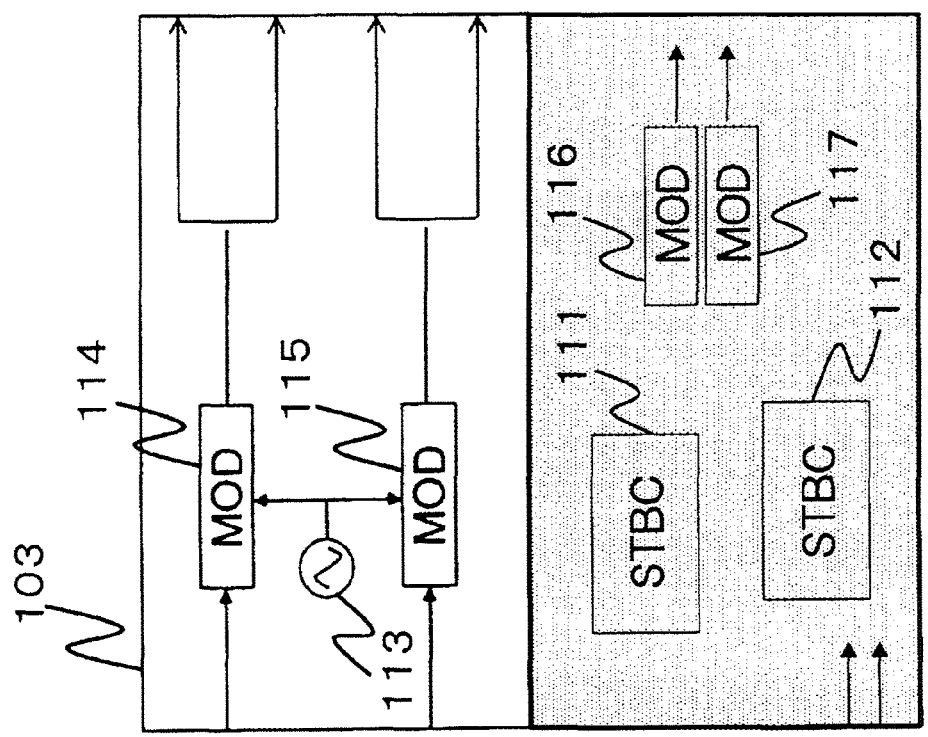
FIG. 6 is a diagram illustrating still another configuration example of the modulator unit according to the first exemplary embodiment of the present invention.

FIG. 6 is a block diagram illustrating the configuration of modulator unit 103 for which a modulation scheme corresponding to the second communication scheme is set. In FIG. 6, any two of inputted signals S1 to S4 (here, inputted signals S1 and S2) are inputted to modulators 114 and 115, respectively. Inputted signal S1 modulated by modulator 114 is branched into two and the two branched signals are inputted to transmission circuits 106 and 107, respectively. Inputted signal S2 modulated by modulator 115 is branched into two and the two branched signals are inputted to transmission circuits 108 and 109, respectively.

When the configuration illustrated in FIG. 6 is achieved, inputted signal S1 is transmitted as a V polarization signal and an H polarization signal via transmission antenna 101 and inputted signal S2 is transmitted as a V polarization signal and an H polarization signal via transmission antenna 102. Accordingly, inputted signals S1 and S2 are transmitted by the second communication scheme which is the combination of the PWD scheme and the MIMO scheme.

Figure 7:
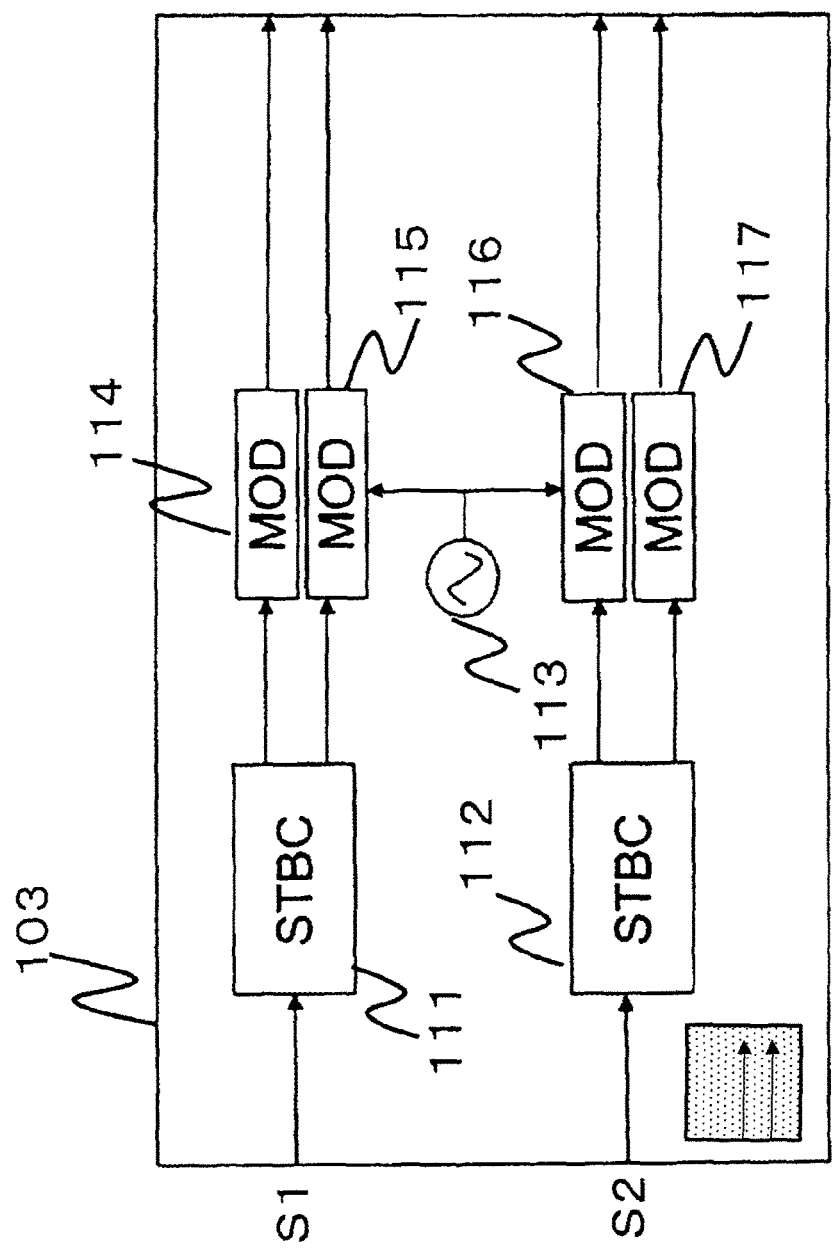
FIG. 7 is a diagram illustrating yet another configuration example of the modulator unit according to the first exemplary embodiment of the present invention.

FIG. 7 is a block diagram illustrating the configuration of modulator unit 103 for which a modulation scheme corresponding to the third communication scheme is set. In FIG. 7, any two of inputted signals S1 to S4 (here, inputted signals S1 and S2) are inputted to time code adding circuits 111 and 112, respectively. Signals S1 encoded by time code adding circuit 111 are inputted to modulator 114 and 115, respectively, and signals S2 encoded by time code adding circuit 112 are inputted to modulator 116 and 117, respectively. Signals S1 modulated by modulators 114 and 115 are inputted to transmission circuits 106 and 108, respectively, and signals S2 modulated by modulators 116 and 117 are inputted to transmission circuits 107 and 109, respectively.

When the configuration illustrated in FIG. 7 is achieved, inputted signals S1 encoded by the STBC are transmitted as V polarization signals via transmission antennas 101 and 102, and inputted signals S2 encoded by the STBC are transmitted as H polarization signals by transmission antennas 101 and 102. Accordingly, inputted signals S1 and S2 are transmitted by the third communication scheme which is the combination of the XPIC scheme and the STBC scheme.

Figure 8:
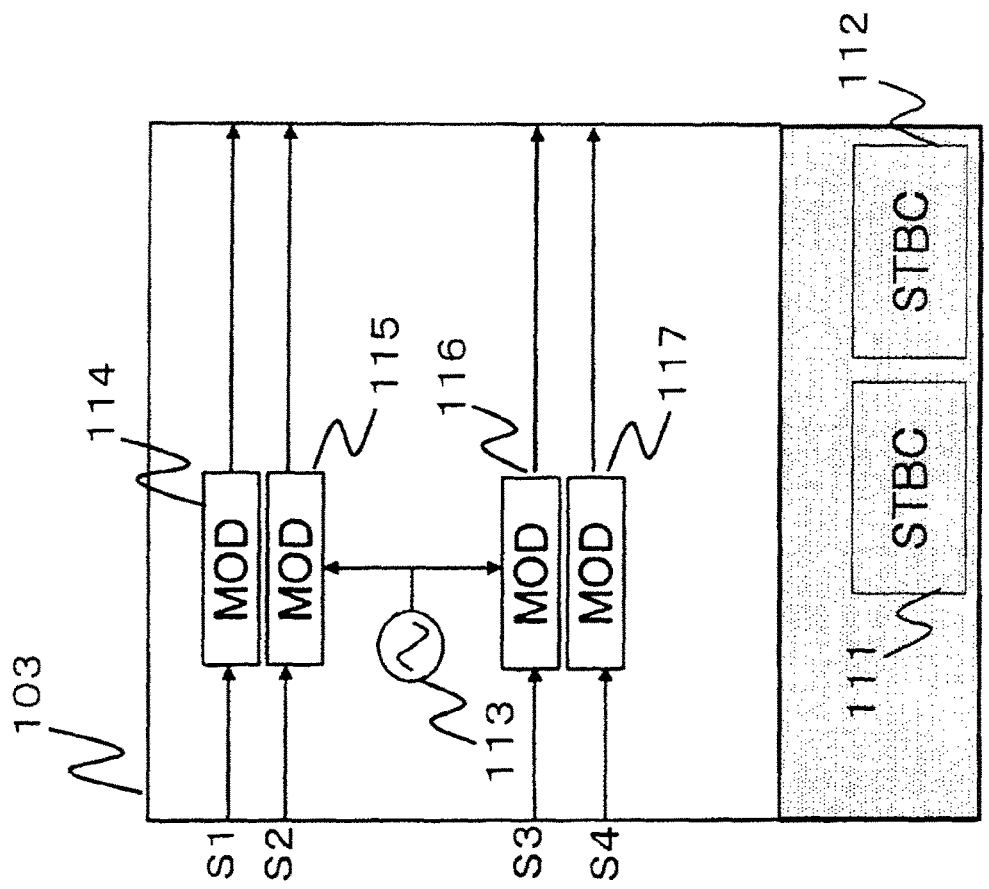
FIG. 8 is a diagram illustrating yet another configuration example of the modulator unit according to the first exemplary embodiment of the present invention.

FIG. 8 is a block diagram illustrating the configuration of modulator unit 103 for which a modulation scheme corresponding to the fourth communication scheme is set. In FIG. 8, inputted signals S1 to S4 are inputted to modulators 114 to 117, respectively. Inputted signals S1 to S4 modulated by modulators 114 to 117 are inputted to transmission circuits 106 to 109, respectively.

When the configuration illustrated in FIG. 8 is achieved, inputted signal S1 is transmitted as a V polarization signal via transmission antenna 101, and inputted signal S2 is transmitted as an H polarization signal via transmission antenna 101. Further, inputted signal S3 is transmitted as a V polarization signal via transmission antenna 102, and inputted signal S4 is transmitted as an H polarization signal via transmission antenna 102. Accordingly, inputted signals S1 to S4 are transmitted by the fourth communication scheme which is the combination of the XPIC scheme and the MIMO scheme.

Figure 9:
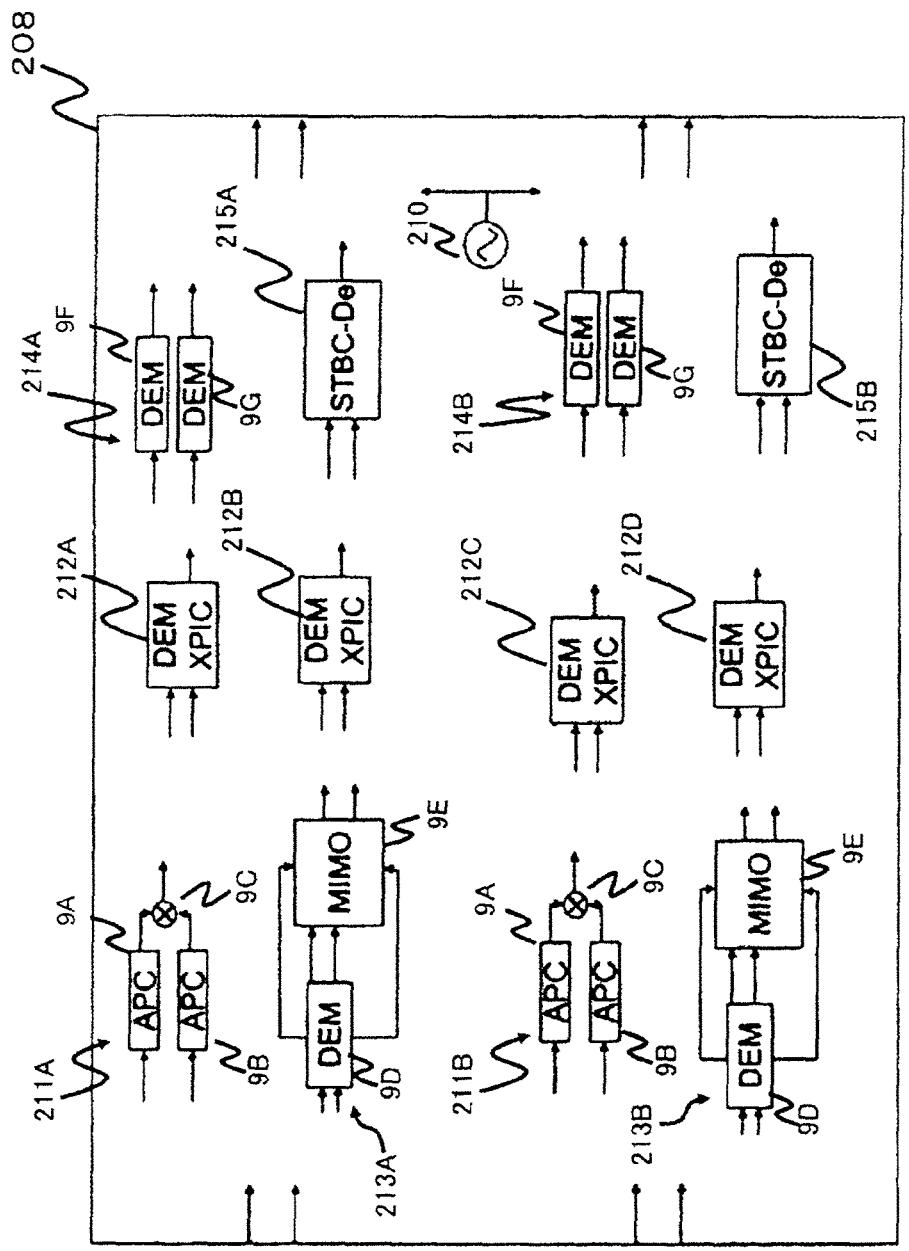
FIG. 9 is a diagram illustrating a configuration example of a demodulator unit according to the first exemplary embodiment of the present invention.

Next, the configuration of demodulator unit 208 of reception device 200 will be described in more detail. FIG. 9 is a block diagram illustrating a configuration example of demodulator unit 208. Demodulator unit 208 illustrated in FIG. 9 includes local oscillator 210, amplitude phase adjusters 211A and 211B, interference cancellers (DEMXPIC) 212A to 212D, MIMO units 213A and 213B, demodulators 214A and 214B, and time space code removing circuits 215A and 215B.

Local oscillator 210 generates oscillation signals for converting IF signals to BB signals and outputs the oscillation signals.

A V polarization signal and an H polarization signal received via the same antenna are inputted to each of amplitude phase adjusters 211A and 211B. Amplitude phase adjusters 211A and 211B each adjust the amplitudes and phases of the inputted V polarization signal and H polarization signal, multiplies the adjusted V polarization signal and H polarization signal, and outputs the resultant signal.

Specifically, amplitude phase adjusters 211A and 211B each include amplification phase adjusting circuits (APC) 9A and 9B and multiplexer 9C. Amplification phase adjusting circuits 9A and 9B each adjust the amplitude and phase of an inputted signal (a V polarization signal or an H polarization signal) and output the adjusted signal. Multiplexer 9C multiplexes the signals outputted from amplification phase adjusting circuits 9A and 9B, and outputs the resultant signal.

Interference cancellers 212A to 212D each include an XPIC (not illustrated) that cancels cross polarization interference, and output a signal for which cross polarization interference has been cancelled by the XPIC.

Two IF signals multiplexed through spatial multiplexing are inputted to each of MIMO units 213A and 213B. In the present exemplary embodiment, the signals multiplexed through spatial multiplexing are the same polarization signals received via different reception antennas. MIMO units 213A and 213B each divide the inputted multiplexed signals.

Specifically, MIMO units 213A and 213B each include demodulating circuit (DEM) 9D and MIMO signal processing circuit (MIMO) 9E. Demodulating circuit 9D converts the two inputted IF signals to BB signals by using oscillation signals supplied from local oscillator 210, and further converts the BB signals to digital signals. Then, demodulating circuit 9D calculates elements of a communication path matrix obtained through calculation of correlation between a pilot signal added to the BB signals, which are the converted digital signals, and signals, of the BB signals, to be demodulated, and inputs the BB signals and the element signals that indicate the elements to MIMO signal processing circuit 9E. MIMO signal processing circuit 9E calculates a matrix composed of elements that are indicated by the inputted element signals relative to the inputted BB signals, and thereby, divides the BB signals into the two multiplexed signals and outputs the two multiplexed signals.

Demodulators 214A and 214B each include two demodulating circuits (DEM) 9F and 9G that each demodulate an inputted signal and outputs the signal. When receiving an IF signal not subjected to spatial multiplexing, each of demodulating circuits 9F and 9G can demodulate the inputted IF signal to a BB signal by using an oscillation signal supplied from local oscillator 210. In addition, when receiving a signal divided by MIMO unit 213A or 213B, each of demodulating circuits 9F and 9G can demodulate the multi-value modulation on the signal.

Time space code removing circuits 215A and 215B each perform, on the inputted signal, demodulation corresponding to the STBC.

Demodulator unit 208 switches the connection relation in demodulator unit 208 in accordance with the modulation scheme set for transmission device 100, and sets a demodulation scheme corresponding to the modulation scheme set for transmission device 100. For example, setter 104 of transmission device 100 may add a pilot signal that indicates a modulation scheme to be set for modulator unit 103 to signals transmitted from transmission device 100, and demodulator unit 208 may set a demodulation scheme in accordance with the pilot signal added to the received signals.

Figure 10:
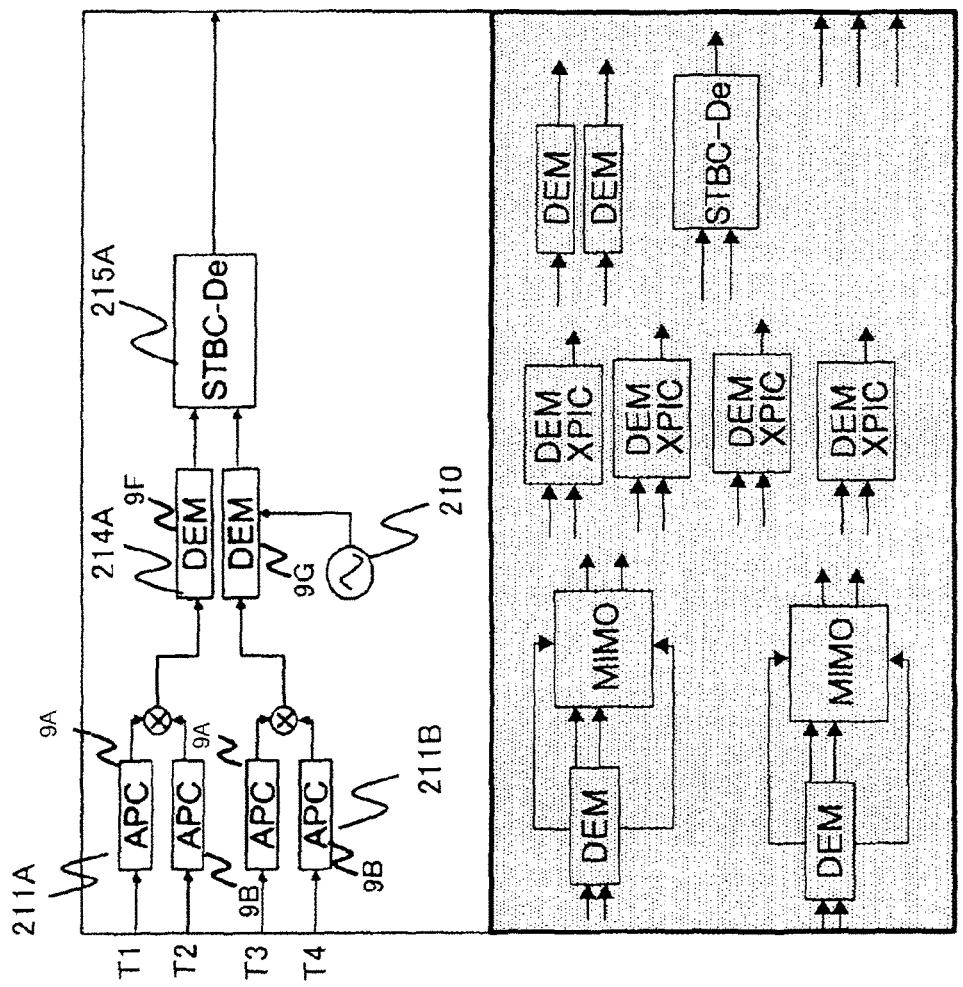
FIG. 10 is a diagram illustrating another configuration example of the demodulator unit according to the first exemplary embodiment of the present invention.

FIG. 10 is a block diagram illustrating a configuration of demodulator unit 208 for which a demodulation scheme corresponding to the first communication scheme is set. In the following description, signals inputted to demodulator unit 208 are referred to as signals T1 to T4. Signal T1 is a V polarization signal received via reception antenna 201. Signal T2 is an H polarization signal received via reception antenna 201. Signal T3 is a V polarization signal received via reception antenna 202. Signal T4 is an H polarization signal received via reception antenna 202.

In FIG. 10, reception signals T1 and T2 are inputted to amplitude phase adjuster 211A, and reception signals T3 and T4 are inputted to amplitude phase adjuster 211B. The signals outputted from amplitude phase adjusters 211A and 211B are inputted to demodulator 214A. Demodulator 214A demodulates the inputted signals by using oscillation signals supplied from local oscillator 210, and inputs the demodulated signals to time space code removing circuit 215A. Accordingly, the signals demodulated by time space code removing circuit 215A are outputted.

Figure 11:
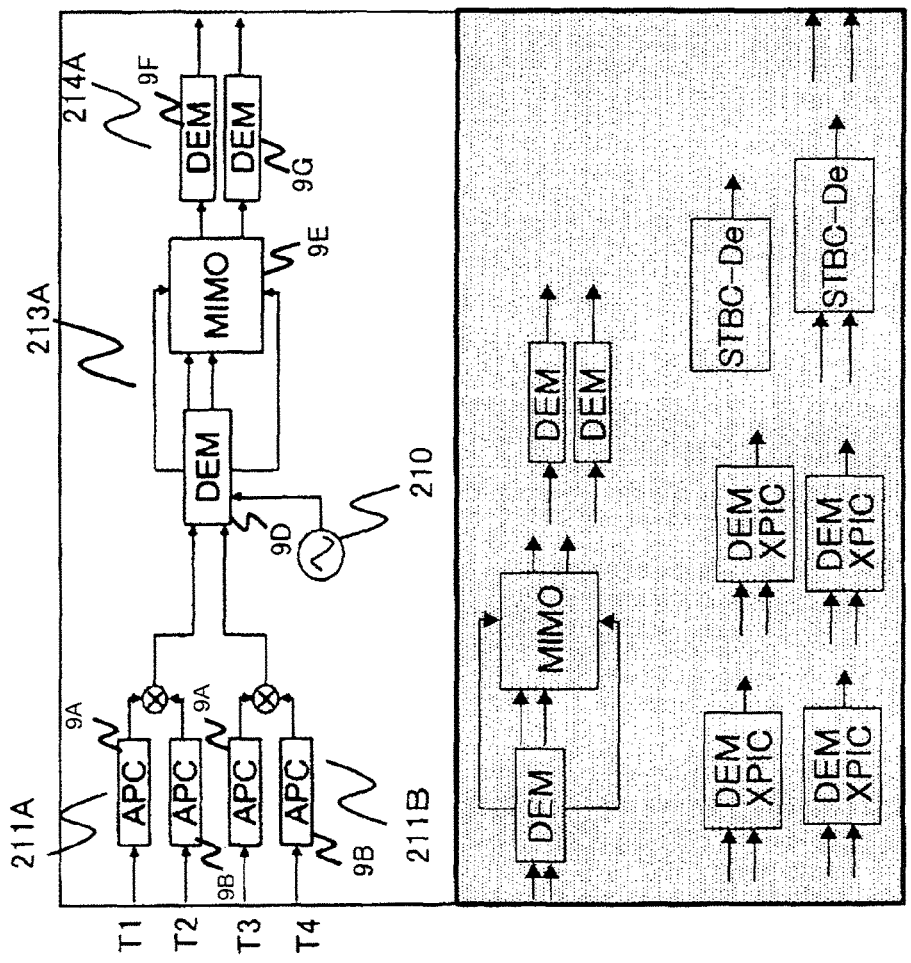
FIG. 11 is a diagram illustrating still another configuration example of the demodulator unit according to the first exemplary embodiment of the present invention.

FIG. 11 is a block diagram illustrating a configuration of demodulator unit 208 for which a demodulation scheme corresponding to the second communication scheme is set. In FIG. 11, reception signals T1 and T2 are inputted to amplitude phase adjuster 211A, and reception signals T3 and T4 are inputted to amplitude phase adjuster 211B. The signals outputted from amplitude phase adjusters 211A and 211B are inputted to MIMO unit 213A. The signals divided by MIMO unit 213A are inputted to demodulator 214A. Accordingly, the demodulator 214A outputs signals subjected to demodulation of multi-value modulation.

Figure 12:
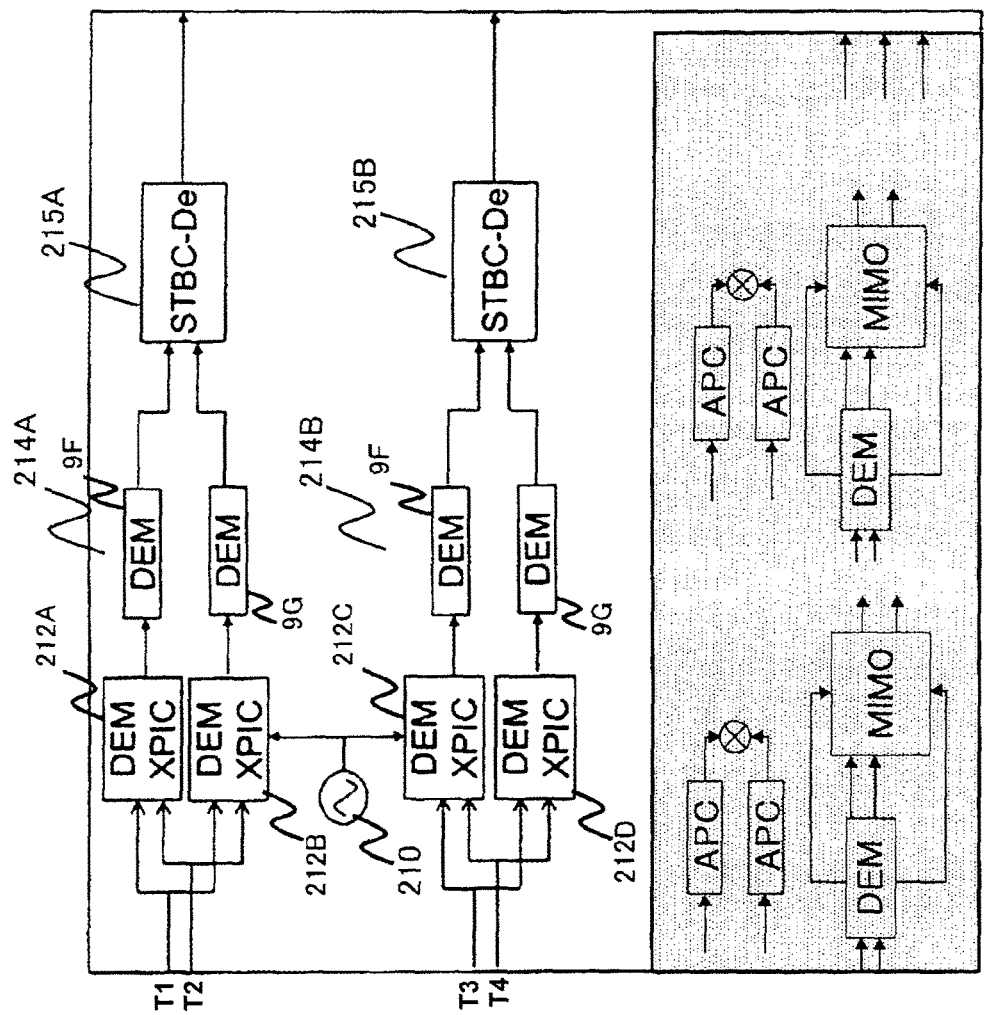
FIG. 12 is a diagram illustrating yet another configuration example of the demodulator unit according to the first exemplary embodiment of the present invention.

FIG. 12 is a block diagram illustrating the configuration of demodulator unit 208 for which a demodulation scheme corresponding to the third communication scheme is set. In FIG. 12, signals T1 and T2 are each branched into two and are respectively inputted to interference cancellers 212A and 212B, and signals T3 and T4 are each branched into two and are respectively inputted to interference cancellers 212C and 212D. The signals outputted from interference cancellers 212A and 212B are inputted to demodulator 214A. The signals outputted from interference cancellers 212C and 212D are inputted to demodulator 214B. The signals outputted from demodulator 214A are inputted to time space code removing circuit 215A. The signals outputted from demodulator 214B are inputted to time space code removing circuit 215B. Accordingly, the signals demodulated by time space code removing circuits 215A and 215B are outputted.

Figure 13:
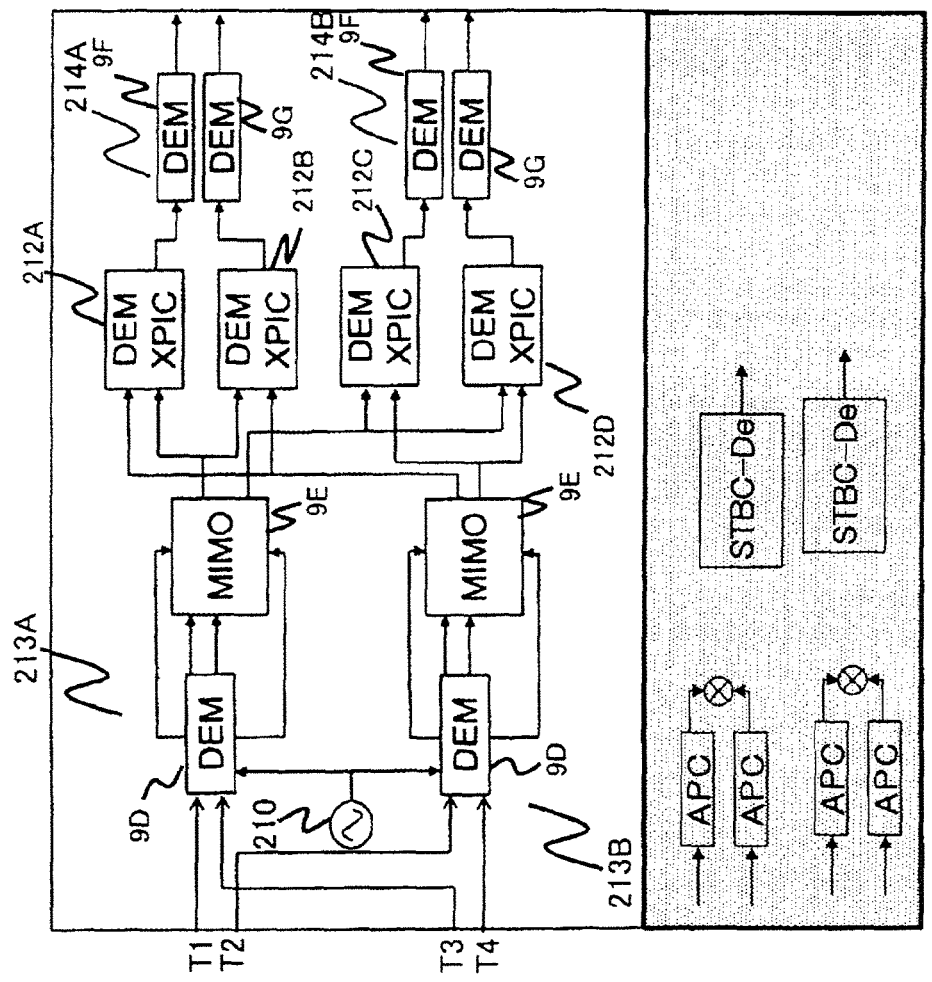
FIG. 13 is a diagram illustrating yet another configuration example of the demodulator unit according to the first exemplary embodiment of the present invention.

FIG. 13 is a block diagram illustrating a configuration of demodulator unit 208 for which a demodulation scheme corresponding to the third communication scheme is set. In FIG. 13, signals T1 and T3 are inputted to MIMO unit 213A, and signals T2 and T4 are inputted to MIMO unit 213B. One of the signals outputted from MIMO unit 213A is inputted to interference cancellers 212A and 212B. The other signal outputted from MIMO unit 213A is inputted to interference cancellers 212C and 212D. One of the signals outputted from MIMO unit 213B is inputted to interference cancellers 212A and 212B. The other signal outputted from MIMO unit 213B is inputted to interference cancellers 212C and 212D. The signals outputted from interference cancellers 212A and 212B are inputted to demodulator 214A. The signals outputted from interference cancellers 212C and 212D are inputted to demodulator 214B. The signals demodulated by demodulators 214A and 214B are outputted.

The antennas and circuits not being used (shaded parts in FIGS. 5 to 8 and 10 to 13) may be used as spare circuits for hot standby.

Next, parameters for selecting a communication scheme will be described in more detail. In the present exemplary embodiment, as described above, control circuit 300 calculates parameters on the basis of a singular value and a tap coefficient obtained by demodulator unit 208.

First, a singular value will be described. Generally, in the case of a 2×2 MIMO scheme (a MIMO scheme having two transmission antennas and two reception antennas), reception signals $Y_1$ and $Y_2$ can be calculated from Expression 1 below.

$$\begin{pmatrix} Y_1 \\ Y_2 \end{pmatrix} = \begin{pmatrix} h_{11} & h_{12} \\ h_{21} & h_{22} \end{pmatrix} \begin{pmatrix} X_1 \\ X_2 \end{pmatrix} + \begin{pmatrix} n_1 \\ n_2 \end{pmatrix} \quad \text{[Expression 1]}$$

In Expression 1, a matrix H including $h_{ij}$ ($h_{11}$ to $h_{22}$) components is a channel matrix, $X_1$ and $X_2$ are transmission signals, and n1 and n2 are noise. In the present exemplary embodiment, $h_{ij}$ corresponds to a complex transmission function from transmission antenna 10$j$ to reception antenna 20$i$. Demodulator unit 208 performs singular value decomposition of channel matrix H to obtain singular values of channel matrix H. In the MIMO scheme, the maximum communication capacity for each communication path is determined in accordance with singular values $\lambda 1$ and $\lambda 2$.

Figure 14:
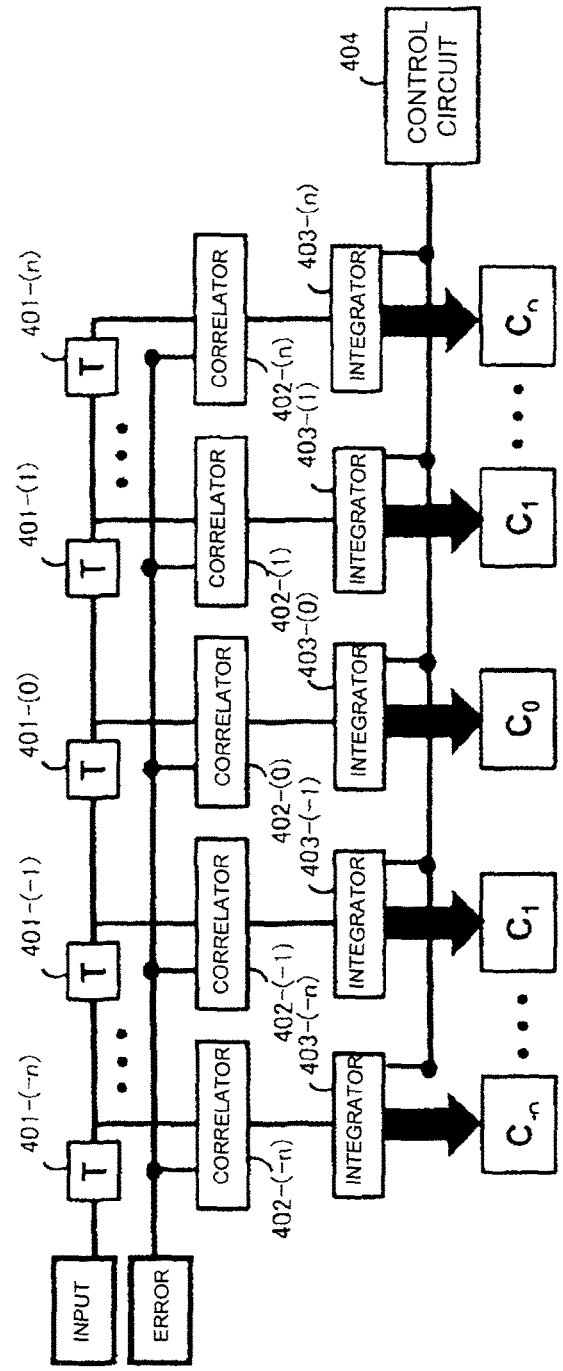
FIG. 14 is a diagram illustrating a configuration example of a transversal filter according to the first exemplary embodiment of the present invention.

Next, a tap coefficient will be described. FIG. 14 is a diagram illustrating a configuration example of a transversal filter used for each of interference cancellers 212A to 212D of demodulator unit 208. The transversal filter illustrated in FIG. 14 includes delay elements 401-(−n) to 401-(n), correlators 402-(−n) to 402-(n), integrators 403-(−n) to 403-(n), and control circuit 404. Here, n is an integer of one or greater.

Signals inputted to the transversal filter are sequentially delayed by delay elements 401-(−n) to 401-(n). Correlators 402-(−n) to 402-(n) calculate and output correlation intensities between the signals delayed by delay elements 401-(−n) to 401-(n) and error signals obtained from the delayed signals. Integrators 403-(−n) to 403-(n) integrate the correlation intensities given by correlators 402-(−n) to 402-(n) to obtain tap coefficients C−n to Cn. Control circuit 404 generates an error signal on the basis of the sum of signals outputted from integrators 403-(−n) to 403-(n).

Control circuit 300 calculates, as parameters, a first parameter X and a second parameter Y on the basis of the singular values and tap coefficients obtained by demodulator unit 208.

Generally, in the case where a plurality of communication paths in the MIMO scheme are assumed to be equivalent communication paths connected in parallel with one another, when the channel response is 1 and the S/N ratio is γ, the total channel capacity C per one second and 1 Hz can be calculated from Expression 2 below. In Expression 2, $\lambda_k$ represents a singular value. In the 2×2 MIMO scheme, k is 2.

$$C = \sum_1^k \log(\lambda_k \gamma + 1)$$ [Expression 2]

By using Expression 2, control circuit 300 calculates, as the first parameter X, the total channel capacity C when k is 2 and the S/N ratio γ is a predetermined value.

Further, control circuit 300 calculates, as the second parameter Y, an integrated value of the tap coefficients calculated by Expression 3 below.

$$Y = \int_{-n}^{n} C_x dx$$ [Expression 3]

Figure 15:
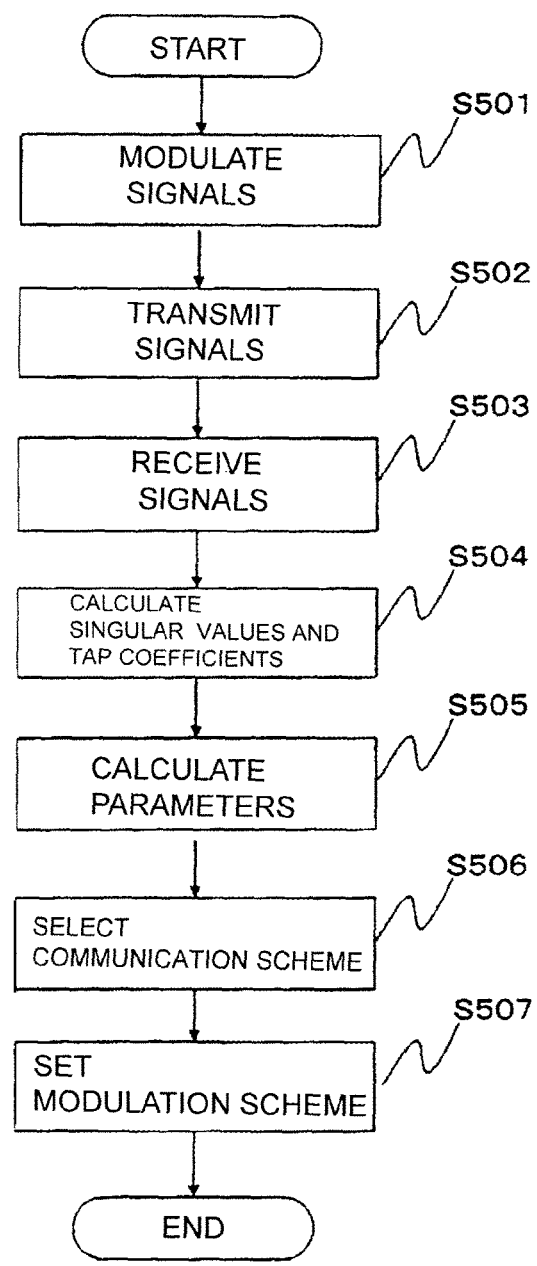
FIG. 15 is a flowchart showing operations of the communication system according to the first exemplary embodiment of the present invention.

Next, operations will be described. FIG. 15 is a flowchart showing operations of communication system 1.

First, modulator unit 103 outputs, to transmission circuits 106 to 109, IF signals which are obtained by modulating inputted signals with by using a set modulation scheme (step S501). After receiving the IF signals, transmission circuits 106 to 109 convert the IF signals to RF signals by using oscillation signals supplied from local oscillator 105, and transmit the RF signals via transmission antenna 101 or 102 (step S502).

Reception circuits 204 to 207 of reception device 200 receive the RF signals via reception antenna 201 or 202, and convert the RF signals to IF signals by using oscillation signals supplied from local oscillator 203, and input the IF signals to demodulator unit 208 (step S503). After receiving the IF signals, demodulator unit 208 demodulates the IF signals to generate and output BB signals, and also calculates singular values and tap coefficients, and notifies control circuit 300 about the singular values and the tap coefficients (step S504).

Control circuit 300 calculates the parameters X and Y on the basis of the notified singular values and tap coefficients (step S505), and selects a communication scheme on the basis of the calculated parameters X and Y (step S506).

Control circuit 300 generates a control signal that indicates the selected communication scheme, and notifies setter 104 of transmission device 100 about the control signal. After receiving the control signal, setter 104 switches the connection relation in modulator unit 103 in accordance with the communication scheme indicated by the control signal, and thereby sets, for modulator unit 103, a modulation scheme corresponding to the communication scheme (step S507).

According to the present exemplary embodiment, modulator unit 103 outputs a plurality of modulation signals modulated by using a set modulation scheme, in the aforementioned manner. The modulator unit including transmission circuits 106 to 109 transmits the plurality of modulation signals. The receiver including reception circuits 204 to 207 receives the plurality of modulation signals transmitted from the transmitter. Control circuit 300 selects a communication scheme on the basis of the parameters corresponding to the phase difference between reception signals, which are the modulation signals received by the receiver, and corresponding to the polarization plane deviation of the reception signals from the transmission signal, which are the modulation signals transmitted from the transmitter. Setter 104 sets, for modulator unit 103, a modulation scheme corresponding to the communication scheme selected by control circuit 300.

Accordingly, the communication scheme is selected in accordance with the phase difference between the reception signals and the polarization plane deviation of the reception signals. Thus, a communication scheme can be appropriately set in accordance with the state of the transmission path, and a stable transmission path can be secured.

Next, another method for calculating parameters will be described as a second exemplary embodiment.

In the present exemplary embodiment, demodulator unit 208 obtains the reception electric field intensities of reception signals, and control circuit 300 calculates, as parameters, a third parameter X2 corresponding to the phase difference between the reception signals and a fourth parameter Y2 corresponding to the polarization plane deviation of the reception signals from transmission signals on the basis of the reception electric field intensities obtained by demodulator unit 208.

Specifically, demodulator unit 208 obtains the reception electric field intensity of a V polarization signal received via reception antenna 201 as V31-RSL, the reception electric field intensity of an H polarization signal received via reception antenna 201 as H31-RSL, the reception electric field intensity of a V polarization signal received via reception antenna 202 as V32-RSL, and the reception electric field intensity of an H polarization signal received via reception antenna 202 as H32-RSL.

Control circuit 300 calculates, as the third parameter X2, the sum of the difference between V31-RSL and H31-RSL and the difference between V32-RSL and H32-RSL. Further, control circuit 300 calculates, as the fourth parameter Y2, the sum of the difference between V31-RSL and V32-RSL and the difference between H31-RSL and H32-RSL.

In this case, when the third parameter X2 is less than a first threshold, control circuit 300 determines that the phase difference falls within a first allowance range, and when the fourth parameter Y2 is less than a second threshold, control circuit 300 determines the polarization plane deviation falls within a second allowance range.

Control circuit 300 selects a communication scheme on the basis of the result of the determination. Specifically, when the phase difference does not fall within the first allowance range, control circuit 300 selects a communication scheme including the STBC scheme, and when the phase difference falls within the first allowance range, control circuit 300 selects a communication scheme including the MIMO. In this case, the correspondence between the communication schemes and the parameters shown in Table 2 is obtained.

TABLE 2

| Scheme | Parameter X2 | Parameter Y2 | Communication capacity |
| --- | --- | --- | --- |
| (1) PWD + STBC | Not less than threshold | Not less than threshold | C |
| (2) PWD + MIMO | Less than threshold | Not less than threshold | 2 × C |
| (3) XPIC + STBC | Not less than threshold | Less than threshold | 2 × C |
| (4) XPIC + MIMO (4 × 4MIMO) | Less than threshold | Less than threshold | 4 × C |

Also in the present exemplary embodiment, a communication scheme is selected in accordance with the phase difference between reception signals and with the polarization plane deviation of the reception signals. Thus, a communication scheme can be appropriately set in accordance with the state of a transmission path, and a stable transmission path can be secured.

Next, still another method for calculating parameters will be described as a third exemplary embodiment.

In the present exemplary embodiment, demodulator unit 208 obtains channel estimation values (hereinafter, referred to as CN estimation values) of reception signals (specifically, modulated reception signals), and control circuit 300 calculates, as parameters, a fifth parameter X3 corresponding to the phase difference between the reception signals and a sixth parameter Y3 corresponding to the polarization plane deviation of the reception signals from transmission signals on the basis of the channel estimation values obtained by demodulator unit 208.

Specifically, when communication between transmission device 100 and reception device 200 is performed by the fourth communication scheme, demodulator unit 208 obtains the CN estimation value of a V polarization signal received via reception antenna 201 as CN1, the CN estimation value of an H polarization signal received via reception antenna 201 as CN2, the CN estimation value of a V polarization signal received via reception antenna 202 as CN3, and the CN estimation value of an H polarization signal received via reception antenna 202 as CN4.

Control circuit 300 calculates, as the fifth parameter X3, the absolute value |(CN1+CN2)−(CN3+CN4)| of the difference between the combined value of CN1 and CN2 and the combined value of CN3 and CN4. Further, control circuit 300 calculates, as the sixth parameter Y3, the absolute value |(CN1+CN3)−(CN2+CN4)| of the difference between the combined value of CN1 and CN3 and the combined value of CN2 and CN4.

In this case, when the fifth parameter X3 is less than the first threshold, control circuit 300 determines that the phase difference falls within the first allowance range, and when the sixth parameter Y3 is less than the second threshold, control circuit 300 determines that the polarization plane deviation falls within the second allowance range.

Control circuit 300 selects a communication scheme on the basis of the result of the above determination. Specifically, when the phase difference does not fall within the first allowance range, control circuit 300 selects a communication scheme including the STBC scheme, and when the phase difference falls within the first allowance range, control circuit 300 selects a communication scheme including the MIMO. In this case, the correspondence between the communication schemes and the parameters shown in Table 3 is obtained.

TABLE 3

| Scheme | Parameter X2 | Parameter Y2 | Communication capacity |
| --- | --- | --- | --- |
| (1) PWD + STBC | Not less than threshold | Not less than threshold | C |
| (2) PWD + MIMO | Less than threshold | Not less than threshold | 2 × C |
| (3) XPIC + STBC | Not less than threshold | Less than threshold | 2 × C |
| (4) XPIC + MIMO (4 × 4MIMO) | Less than threshold | Less than threshold | 4 × C |

In the present exemplary embodiment, the CN estimation values in the case where communication between transmission device 100 and reception device 200 is performed by the fourth communication scheme are used to calculate the parameters. For this reason, communication needs to be performed by the fourth communication scheme at least once. Thus, setter 104 of transmission device 100 sets, for modulator unit 103, a modulation scheme corresponding to the fourth communication scheme at startup or regularly, for example.

Also in the present exemplary embodiment, a communication scheme is selected in accordance with the phase difference between reception signals and polarization plane deviation of the reception signals. Accordingly, a communication scheme can be appropriately set in accordance with the state of a transmission path and a stable transmission path can be ensured. As one example of effects of the present invention, a stable transmission path can be secured.

In the exemplary embodiments having been described above, the illustrated configurations are just examples and the present invention is not limited to the configurations.

For example, control circuit 300 of reception device 200 may select a communication scheme directly on the basis of the phase difference between reception signals and on the basis of polarization plane deviation of the reception signals from transmission signals, instead of using the parameters corresponding to the phase difference and the polarization plane deviation. Also in this case, a communication scheme can be set appropriately in accordance with the state of a transmission path, and a stable transmission path can be secured.

Moreover, in each of the above exemplary embodiments, reception device 200 selects a communication scheme. However, transmission device 100 may select a communication scheme. In this case, control circuit 300 of reception device 200 transmits, to transmission device 100, a control signal that indicates the phase difference and the polarization plane deviation. Here, control circuit 300 may transmit, as the control signal, a control signal that indicates parameters. Furthermore, after receiving the control signal, setter 104 of transmission device 100 selects a communication scheme on the basis of the control signal, and sets, for modulator unit 103, a modulation scheme corresponding to the selected communication scheme. Methods by which setter 104 selects a communication scheme are same as the methods by which control circuit 300 selects a communication scheme in the first to third exemplary embodiments.

In addition, the whole or part of the above exemplary embodiments can be described as, but not limited to, the following notes.

Appendix 1

A communication system comprising:
a modulator unit that outputs a plurality of modulation signals modulated by using a set modulation scheme;
a transmitter that transmits the plurality of modulation signals;
a receiver that receives the plurality of modulation signals transmitted from the transmitter;
a controller that selects a communication scheme on the basis of the phase difference between reception signals, which are the modulation signals received by the receiver, and on the basis of polarization plane deviation of the reception signals from transmission signals, which are the modulation signals transmitted by the transmitter; and
a setter that sets, for the modulator unit, a modulation scheme corresponding to the communication scheme selected by the controller.

Appendix 2

The communication system according to Appendix 1, wherein the controller determines whether or not the polarization plane deviation falls within a first allowance range and whether or not the phase difference falls within a second allowance range, and selects the communication scheme on the basis of the result of the determination.

Appendix 3

The communication system according to Appendix 2, wherein
when the phase difference falls within the first allowance range, the controller selects a communication scheme including a spatial multiplex transmission scheme.

Appendix 4

The communication system according to Appendix 2 or 3, wherein
when the phase difference does not fall within the first allowance range, the controller selects a communication scheme including a space diversity scheme.

Appendix 5

The communication system according to any one of Appendixes 2 to 4, wherein
when the polarization plane deviation falls within the second allowance range, the controller selects a communication scheme including a polarized-wave multiplexing transmission scheme.

Appendix 6

The communication system according to any one of Appendixes 2 to 5, wherein
when the polarization plane deviation does not fall within the second allowance range, the controller selects a communication scheme including a polarized wave diversity scheme.

Appendix 7

The communication system according to any one of Appendixes 1 to 6, further comprising a demodulator unit that demodulates the reception signals by a demodulation scheme corresponding to the set modulation scheme.

Appendix 8

The communication system according to any one of Appendixes 1 to 7, wherein
the controller calculates parameters corresponding to the phase difference and the polarization plane deviation, and selects the communication scheme on the basis of the parameters.

Appendix 9

The communication system according to Appendix 8, further comprising
an interference canceller that cancels cross polarization interference between the reception signals, wherein
the controller calculates the parameters on the basis of singular values of a channel matrix between the transmitter and the receiver and of tap coefficients of a transversal filter to be used for the interference canceller.

Appendix 10

The communication system according to Appendix 8, wherein
the controller calculates the parameters on the basis of the reception electric fields of the reception signals.

Appendix 11

The communication system according to Appendix 8, wherein
the controller calculates the parameters on the basis of channel estimation values of the reception signals.

Appendix 12

A reception device comprising:
a receiver that receives a plurality of modulation signals modulated by a transmission device; and
a controller that selects a communication scheme on the basis of phase difference between reception signals, which are the modulation signals received by the receiver, and of polarization plane deviation of the reception signals from transmission signals, which are the transmitted modulation signals, and sets, for the transmission device, a modulation scheme corresponding to the communication scheme.

Appendix 13

A reception device comprising:
a receiver that receives a plurality of modulation signals modulated by a transmission device; and
a controller that notifies the transmission device about a control signal that indicates phase difference between reception signals, which are the modulation signals received by the receiver, and of polarization plane deviation of the reception signals from transmission signals, which are the transmitted modulation signals.

Appendix 14

A transmission device comprising:
a modulator unit that outputs a plurality of modulation signals modulated by using a set modulation scheme;

a transmitter that transmits the plurality of modulation signals; and a setter that receives a control signal that indicates a communication scheme selected by a reception device configured to receive the modulation signals, and sets, for the modulator unit, a modulation scheme corresponding to the communication scheme indicated by the control signal.

Appendix 15

A transmission device comprising:
a modulator unit that outputs a plurality of modulation signals modulated by using a set modulation scheme; and
a transmitter that transmits the plurality of modulation signals, wherein
from a reception device configured to receive the modulation signals, a control signal that indicates phase difference between reception signals, which are the modulation signals received by the reception device, and of polarization plane deviation of the reception signals from transmission signals, which are the modulation signals transmitted by the transmitter is received, and a modulation scheme corresponding to the control signal is set for the modulator unit.

Appendix 16

A communication method comprising:
outputting a plurality of modulation signals modulated by using a set modulation scheme;
transmitting the plurality of modulation signals;
receiving the plurality of transmitted modulation signals;
selecting a communication scheme on the basis of phase difference between reception signals, which are the received modulation signals, and of polarization plane deviation of the reception signals from transmission signals, which are the transmitted modulation signals; and
setting a modulation scheme corresponding to the selected communication scheme.

Appendix 17

A communication method comprising:
receiving a plurality of modulation signals modulated by a transmission device; and
selecting a communication scheme on the basis of phase difference between reception signals, which are the received modulation signals, and of polarization plane deviation of the reception signals from transmission signals, which are the transmitted modulation signals, and setting, for the transmission device, a modulation scheme corresponding to the communication scheme.

Appendix 18

A communication method comprising:
receiving a plurality of modulation signals modulated by a transmission device; and
notifying the transmission device about a control signal that indicates phase difference between reception signals, which are the modulation signals received by the receiver, and of polarization plane deviation of the reception signals from transmission signals, which are the transmitted modulation signals.

Appendix 19

A communication method comprising:
outputting a plurality of modulation signals modulated by using a set modulation scheme;
transmitting the plurality of modulation signals; and
receiving a control signal that indicates a communication scheme selected by a reception device configured to receive the modulation signals, and setting a modulation scheme corresponding to the communication scheme indicated by the control signal.

Appendix 20

A communication method comprising:
outputting a plurality of modulation signals modulated by using a set modulation scheme;
transmitting the plurality of modulation signals; and
receiving, from a reception device configured to receive the modulation signals, a control signal that indicates phase difference between reception signals, which are the modulation signals received by the reception device, and of polarization plane deviation of the reception signals from transmission signals, which are the transmitted modulation signals, and setting a modulation scheme corresponding to the control signal.

The present invention has been described above through the exemplary embodiments, but the present invention is not limited to the above exemplary embodiments. Within the scope of the present invention, various modifications that can be appreciated by a person skilled in the art may be made to the configuration or details of the present invention.

The present application is based upon and claims the benefit of priority from prior Japanese Patent Application No. 2014-25200, filed Nov. 5, 2014, the entire contents of which are incorporated herein by reference.

REFERENCE SIGNS LIST

100 Transmission device
101, 102 Transmission antenna
103 Modulator unit
104 Setter
105, 113, 203, 210 Local oscillator
106 to 109 Transmission circuit
111, 112 Time code adding circuit
114 to 117 Modulator
200 Reception device
201, 202 Reception antenna
204 to 207 Reception circuit
208 Demodulator unit
211A, 211B Amplitude phase adjuster
212A to 212D Interference canceller
213A, 213B MIMO unit
214A, 214B Demodulator
251A, 245B Time space code removing circuit
300 Control circuit

The invention claimed is:
1. A communication system comprising:
a modulator unit that outputs a plurality of modulation signals modulated by using a set modulation scheme;
a transmitter that transmits the plurality of modulation signals;
a receiver that receives the plurality of modulation signals transmitted from said transmitter;
a controller that selects a communication scheme on basis of phase difference between reception signals, which are the modulation signals received by said receiver, and of polarization plane deviation of the reception signals from transmission signals, which are the modulation signals transmitted from said transmitter; and a setter that sets, for said modulator unit, a modulation scheme corresponding to the communication scheme selected by said controller.

2. The communication system according to claim 1, wherein said controller determines whether or not the polarization plane deviation falls within a first allowance range and whether or not the phase difference falls within a second allowance range, and selects the communication scheme on basis of the result of the determination.

3. The communication system according to claim 2, wherein when the phase difference falls within the first allowance range, said controller selects a communication scheme including a spatial multiplex transmission scheme.

4. The communication system according to claim 2, wherein when the phase difference does not fall within the first allowance range, said controller selects a communication scheme including a space diversity scheme.

5. The communication system according to claim 2, wherein when the polarization plane deviation falls within the second allowance range, said controller selects a communication scheme including a polarized-wave multiplexing transmission scheme.

6. The communication system according to claim 2, wherein when the polarization plane deviation does not fall within the second allowance range, said controller selects a communication scheme including a polarized wave diversity scheme.

7. A reception device comprising:

a receiver that receives a plurality of modulation signals modulated by a transmission device; and a controller that selects a communication scheme on basis of phase difference between reception signals, which are the modulation signals received by said receiver, and of polarization plane deviation of the reception signals from transmission signals, which are the modulation signals transmitted from said transmission device, and sets, for said transmission device, a modulation scheme corresponding to the communication scheme.

8. A transmission device comprising:

a modulator unit that outputs a plurality of modulation signals modulated by using a set modulation scheme; and a transmitter that transmits the plurality of modulation signals, wherein from a reception device configured to receive the modulation signals, a control signal that indicates phase difference between reception signals which are the modulation signals is received by the reception device, and that indicates polarization plane deviation of the reception signals from transmission signals which are the modulation signals transmitted from said transmitter is received, a communication scheme is selected on basis of the control signal, and a modulation scheme corresponding to the communication scheme is set for said modulator unit.

9. A communication method comprising:

outputting a plurality of modulation signals modulated by using a set modulation scheme;

transmitting the plurality of modulation signals;

receiving the plurality of transmitted modulation signals;

selecting a communication scheme on basis of phase difference between reception signals, which are the received modulation signals, and of polarization plane deviation of the reception signals from transmission signals, which are the transmitted modulation signals; and setting a modulation scheme corresponding to the selected communication scheme.

10. The communication system according to claim 3, wherein when the phase difference does not fall within the first allowance range, said controller selects a communication scheme including a space diversity scheme.

11. The communication system according to claim 3, wherein when the polarization plane deviation falls within the second allowance range, said controller selects a communication scheme including a polarized-wave multiplexing transmission scheme.

12. The communication system according to claim 4, wherein when the polarization plane deviation falls within the second allowance range, said controller selects a communication scheme including a polarized-wave multiplexing transmission scheme.

13. The communication system according to claim 3, wherein when the polarization plane deviation does not fall within the second allowance range, said controller selects a communication scheme including a polarized wave diversity scheme.

14. The communication system according to claim 4, wherein when the polarization plane deviation does not fall within the second allowance range, said controller selects a communication scheme including a polarized wave diversity scheme.

15. The communication system according to claim 5, wherein when the polarization plane deviation does not fall within the second allowance range, said controller selects a communication scheme including a polarized wave diversity scheme.

16. The communication system according to claim 10, wherein when the polarization plane deviation falls within the second allowance range, said controller selects a communication scheme including a polarized-wave multiplexing transmission scheme.

17. The communication system according to claim 10, wherein when the polarization plane deviation does not fall within the second allowance range, said controller selects a communication scheme including a polarized wave diversity scheme.

18. The communication system according to claim 11, wherein when the polarization plane deviation does not fall within the second allowance range, said controller selects a communication scheme including a polarized wave diversity scheme.

19. The communication system according to claim 12, wherein when the polarization plane deviation does not fall within the second allowance range, said controller selects a communication scheme including a polarized wave diversity scheme.

* * * * *